(12) United States Patent
Meitin

(10) Patent No.: US 11,236,810 B1
(45) Date of Patent: Feb. 1, 2022

(54) CONTINUOUSLY VARIABLE TRANSMISSION FOR HEAVY DUTY VEHICLES

(71) Applicant: Manuel Meitin, Miami, FL (US)

(72) Inventor: Manuel Meitin, Miami, FL (US)

( * ) Notice: Subject to any disclaimer, the term of this patent is extended or adjusted under 35 U.S.C. 154(b) by 0 days.

(21) Appl. No.: 17/300,479

(22) Filed: Jul. 16, 2021

(51) Int. Cl.
*F16H 47/08* (2006.01)

(52) U.S. Cl.
CPC .................... *F16H 47/08* (2013.01)

(58) Field of Classification Search
None
See application file for complete search history.

(56) References Cited

U.S. PATENT DOCUMENTS

| | | | |
|---|---|---|---|
| 3,739,658 A | 6/1973 | Scheiter | |
| 4,107,776 A | 8/1978 | Beale | |
| 4,354,401 A | 10/1982 | Omitsu | |
| 4,369,672 A | 1/1983 | Ohutsuka | |
| 4,430,908 A | 2/1984 | Stockton | |
| 4,913,002 A | 4/1990 | Fellows | |
| 6,702,701 B2 | 3/2004 | Phelan | |
| 8,152,673 B2 | 4/2012 | Yanay | |
| 2008/0300081 A1* | 12/2008 | Meitin | F16H 47/08 475/36 |
| 2013/0281244 A1* | 10/2013 | Vaughn | F16H 47/04 475/72 |

* cited by examiner

*Primary Examiner* — Colby M Hansen

(57) ABSTRACT

A continuously variable transmission for heavy duty vehicles, in which the classic hydraulic torque converter is permanently removed, comprising at least two planetary gear assemblies; a hydraulic pump, used as a gradual brake; a hydro-mechanical device for transforming the torque generated by the drive engine of the vehicle into a variable torque; a hydraulic regulator to control all torque variations in the hydro-mechanical device; a reverse drive mechanism that controls a forward or reverse movement of the vehicle; and a freewheel that allows for a transmission of a different variable gear ratios from the drive engine of the vehicle to at least one of the driving wheels or caterpillars.

4 Claims, 2 Drawing Sheets

CONTINUOUSLY VARIABLE TRANSMISSION FOR HEAVY DUTY VEHICLES

REFERENCES CITED

U.S. Patent Documents

U.S. Pat. No. 3,739,658 June 1973 Scheiter 74/130
U.S. Pat. No. 4,107,776 August 1978 Beale 74/866
U.S. Pat. No. 4,354,401 October 1982 Omitsu 74/689
U.S. Pat. No. 4,369,672 January 1983 Ohtsuka 475/54
U.S. Pat. No. 4,430,908 February 1984 Stockton 475/55
U.S. Pat. No. 4,913,002 April 1990 Fellows 475/55
U.S. Pat. No. 6,702,701 B2 March 2004 Phelan 475/91
U.S. Pat. No. 8,152,673 B2 April 2012 Yanay 475/93

BACKGROUND OF THE INVENTION

This invention relates to a continuously variable transmission for heavy duty vehicles, suitable for heavy duty trucks, agriculture tractors, some military heavy vehicles as battle tanks as well as for other types of vehicles. The transmission comprises at least two planetary gear assemblies; a freewheel; an oil pump, used as a gradual brake; and a flow control valve, automatically driven by means of a hydraulic regulator, for adjusting the torque transmission from the drive engine of the vehicle to at least one of the driving wheels or caterpillars.

DESCRIPTION OF THE RELATED ART

A typical automatic transmission for automobiles usually comprises a hydraulic torque converter; some planetary gear assemblies; some brake devices; and a control system, for transmitting the torque generated by a combustion engine to the driving wheels of the vehicle, wherein the torque is always transmitted in several stages and never in the form of continuously variable-way.

A more recently developed transmission for automobiles generally includes a set of adjustable pitch pulleys working in cooperation with a belt for variably transmitting the torque from the drive engine of the vehicle to the driving wheels. Belt structure of the type designed for those transmissions has been improved several times in order to provide an acceptable durability, however only a limited torque can be transmitted using such technology, however it is not suitable to heavy duty vehicles.

According to the present invention, the torque generated by the vehicle engine is transmitted to the driving wheels combining some operative features and several parts of a typical automatic transmission with the performance and benefits of a continuously variable transmission. Moreover, the results in doing so include an improvement in fuel efficiency standards, a faster acceleration, easier repairs, and a lower production and maintenance cost.

SUMMARY OF THE INVENTION

It is an object of the present invention to provide a new continuously variable transmission for heavy duty vehicles in a compact and lighter unit with a simplified design, also suitable for military battle tanks as well as for other motorized vehicles in civil uses which include hybrid electric types.

It is also an object of the invention to improve strategic mobility in the military ground transportation in order to arrive timely, in a cost effective way, allowing a substantial improvement in fuel efficiency standards, increasing autonomy.

It is also an object of the invention to provide a structure that allows to carry out repairs made by repairmen not specialized in automatic transmissions.

It is an object of the invention to reduce weight and volume as a result of the permanent removal of the hydraulic torque converter.

It is also an object of the present invention to provide a new transmission at a lower production cost.

It is another object of the invention to provide a reliable, robust and durable transmission, requiring less repairs needs.

These and other objects, features and advantages of the present invention will become more clear when the drawings as well as detailed description be taken into consideration.

BRIEF DESCRIPTION OF THE DRAWINGS

For a fuller understanding of the nature of this invention, reference should be had to the following drawings in which.

DETAILED DESCRIPTION OF THE INVENTION

The present invention is directed to a continuously variable transmission for heavy duty vehicles including hybrid electric trucks of any loading capacity, agricultural tractors, battle tanks and other motorized equipments to transmit a variable torque from the internal combustion engine or the electric motor of said vehicles to at least of one of the driving wheels or caterpillars.

Figure 1:
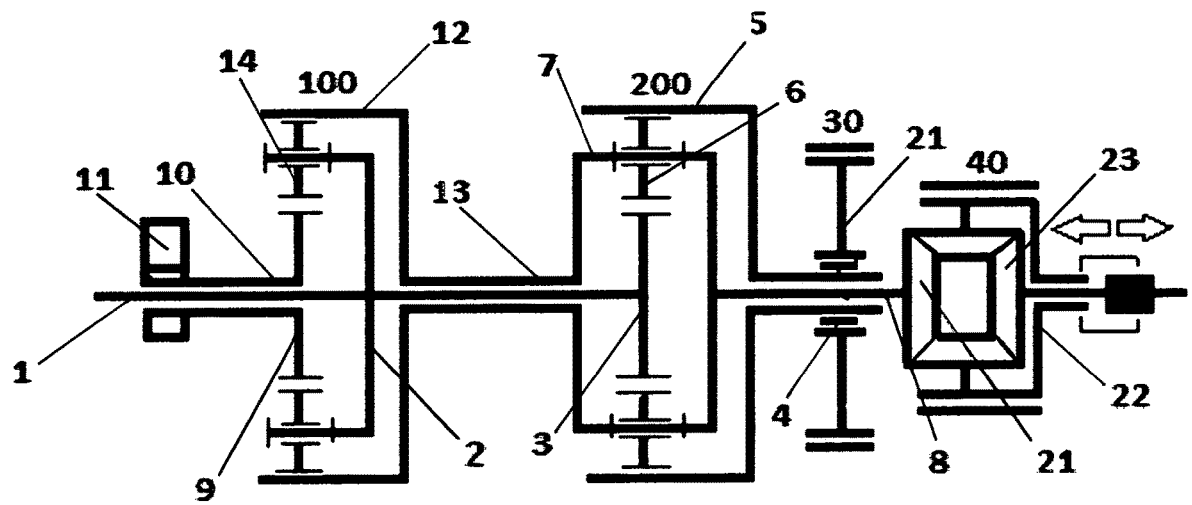
FIG. 1 illustrates a typical embodiment of the present invention showing a diagram for heavy duty motorized vehicles.
Figure 2:
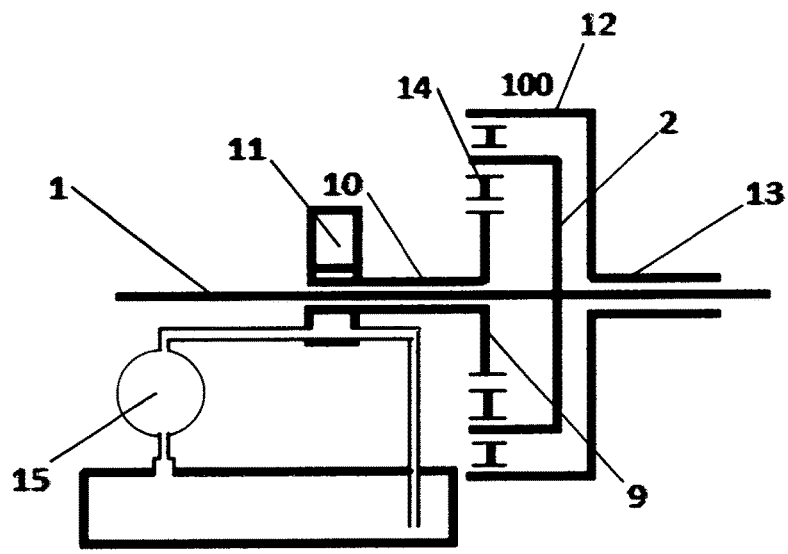
FIG. 2 represents a diagram of a hydro-mechanical device comprising: a hydraulic pump used as a gradual brake; a flow control valve; and a secondary planetary gear assembly to transform the torque generated by the drive engine of the vehicle into a continuously variable torque.
Figure 3:
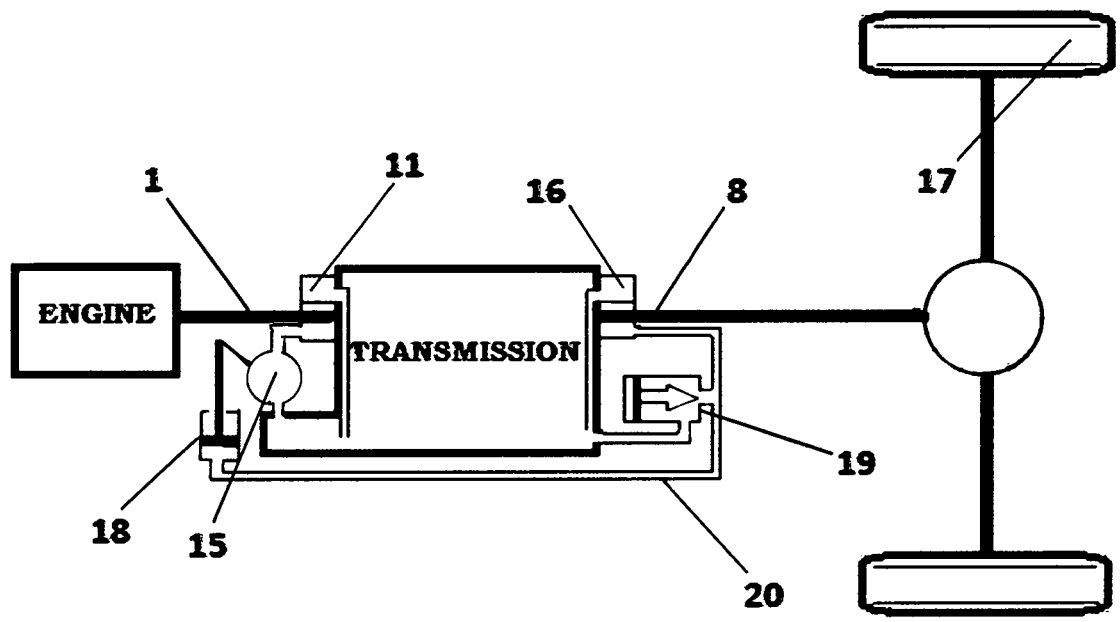
FIG. 3 represents a simplified diagram of a hydraulic regulator used to adjust every torque variation taking place in the hydro-mechanical device, and also showing the external connections to the transmission which includes the drive engine and the driving wheels or caterpillars of the vehicle.
Figure 4:
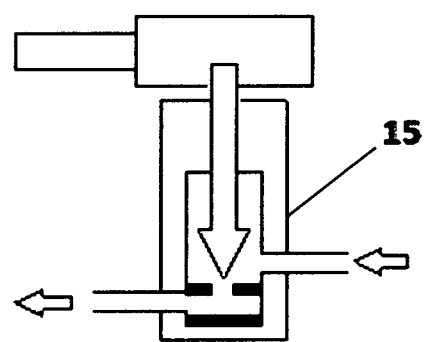
FIG. 4 shows a scheme of the flow control valve.

More specifically, the embodiment of the present invention shown in FIG. 1 and FIG. 2 includes at least two planetary gear assemblies 100 and 200; a freewheel 4; an oil pump 11 acting as a gradual brake; and a flow control valve 15 controlled by a hydraulic regulator as shown in FIG. 3.

Accordingly with the references of the embodiment of FIG. 1 and FIG. 2, the torque generated by the drive engine of the vehicle is transmitted by means of an input shaft 1 to a satellites carrier 2 of a secondary planetary gear assembly 100 and at the same time to a sun gear 3 of a main planetary gear assembly 200. A freewheel 4 is connected to a ring gear 5 of the main planetary gear 200 allowing said ring gear to rotate only in the same way as engine does but braked at opposite direction. On the other hand said sun gear 3 transmits the torque from the input shaft 1 to a plurality of satellites 6 which lean back against the ring gear 5 in such a way that the rotation movement of a carrier 7 of the main planetary gear 200 can be transmitted to an output shaft 8 with a torque which is the highest available, taken into account the dimensions of the sun gear 3 as well as the ring gear 5 of the planetary gear assembly itself.

It is said before that the torque generated by the drive engine of the vehicle was also transmitted by means of the input shaft 1, FIG. 1 and FIG. 2, to the satellites carrier 2, of the secondary planet gear assembly 100, in which a sun gear 9 is connected by means of a shaft 10 to an impeller of an hydraulic pump 11. A ring gear 12 of the secondary planetary gear assembly 100 is also connected to a satellites carrier 7 of the main planetary gear assembly 200 by means of a shaft 13 allowing a permanent connection to the driving wheels by means of the output shaft 8 in such a way that when the wheels of the vehicle are stationary, said ring gear 12 remains stopped too and as a result, the rotation of the carrier 2 which includes the plurality of satellites 14, is transmitted to the sun gear 9 and to the impeller of the hydraulic pump 11 by means of the shaft 10.

Considering that a flow control valve 15, FIG. 2 and FIG. 3 controls the oil flowing through the hydraulic pump 11, at a fully open position of the valve 15, the sun gear 9 and the impeller of the oil pump 11 rotates free by the action of the satellites carrier 2 and no movement is transmitted to the ring gear 12.

At a fully closed position of the valve 15, both, the sun gear 9 and the impeller of the pump 11 are braked because the oil contained inside the pump can not be compressed and at this point the rotation of the carrier 2 is transmitted only to the ring gear 12, shaft 13, carrier 7 and output shaft 8 in which the output rotation speed is increased and the torque decreased because of the overdrive effect taking place at the secondary planetary gear 100. Several gradual opening positions of the flow control valve 15 can be obtained from fully opened to fully closed positions in such a way that the rotation speed and torque of the sun gear 9 and the output shaft 8 becomes variable. In other words more speed and less torque is obtained, or high torque and less rotation speed can take place in accordance to the degree of aperture of the flow control valve 15 which is adjusted by means of a hydraulic regulator that is shown in FIG. 3, and comprises:
an auxiliary hydraulic pump 16 FIG. 3, that is connected and driven by the output shaft 8, is configured to pump oil when the driving wheels 17 are in motion.
a hydraulic booster 18 used to drive the flow control valve 15 when receiving oil pressure from the secondary hydraulic pump 16.
a pipe line 20 FIG. 3 which connects the auxiliary hydraulic pump 16 to the hydraulic booster 18; and
a pressure regulator 19 FIG. 3 derived from the pipe line 20 to drain the excessive oil provided from the secondary hydraulic pump 16 in correspondence to the rotation speed of the driving wheels 17.
OTHER CONTROLS. As pointed out before, the freewheel 4, FIG. 1 is connected to the ring gear 5 of the main planetary gear 200 to permit said ring gear 5 to rotate only in the same way as engine does, but a housing 21, FIG. 1 is provided to place said freewheel 4, allowing a free rotation of the ring gear in both ways considering that the brake 30 is not applied over the housing 21. On the other hand if the brake 30 is applied over the housing 21, the ring gear 5 is immediately stopped in one way and the torque generated at the planetary gear assembly 200 is transmitted to the output shaft 8. Neutral or drive shifting positions takes place depending on the action of the brake 30 over the housing 21. Such arrangement avoids the use of any type of clutch between the drive engine of the vehicle and the transmission.

REVERSE SHIFTER. A typical reverse unit is provided to show an optional way to invert the rotation at the output 8 FIG. 1 using four ordinary bevel gears, connecting said output shaft 8 to the input gear 21 of that gear system and braking the carrier 22 by means of the brake 40, so that the output gear 23 which is connected to the driving wheels then turns in opposite direction. Releasing the brake 40, no movement is transmitted, but coupling the output gear 23 together with the carrier 22 as a unit, the rotation is kept in the same direction.

What I claim as my invention is:

1. A continuously variable transmission for heavy duty vehicles, comprising:
   a main planetary gear assembly that is configured to provide a highest torque at the commencement of the movement of a vehicle or at any point in which said vehicle requires the higher torque;
   a hydro-mechanical device that is configured to work in conjunction to the main planetary gear assembly and that is configured to transform the torque generated by a drive engine of the vehicle into a continuously variable torque;
   a hydraulic regulator that is configured to adjust all torque variations taking place in the hydro-mechanical device;
   a freewheel that connects to a ring gear of the main planetary gear assembly that is configured to transmit different variable gear ratios to at least one of the driving wheels, or caterpillars; and
   a reverse shifter that is configured to control a forward or reverse movement of the vehicle.

2. The continuously variable transmission for heavy duty vehicles of claim 1, where the hydro-mechanical device comprises:
   a secondary planetary gear assembly that is configured to be driven
   by an input shaft which is connected to a drive engine output;
   a hydraulic pump that is configured to serve as a gradual brake; and
   a flow control valve that connects to an exit of the hydraulic pump that is configured to regulate the volume of liquid flowing through said hydraulic pump.

3. The continuously variable transmission for heavy duty vehicles of claim 2, wherein the secondary planetary gear assembly comprises of:
   a satellites carrier, used to transmit the rotation from the output shaft which is connected to the drive engine output to a plurality of satellites of the secondary planetary gear assembly;
   a solar gear which is configured to transmit the rotation from the plurality of satellites of the secondary planetary gear assembly to an impeller of the hydraulic pump; and
   a ring gear that is configured to transmit the rotation from the secondary planetary gear assembly to a satellites carrier of the main planetary gear, only if the impeller of the hydraulic pump is partially or is fully blocked by the action of the flow control valve.

4. The continuously variable transmission for heavy duty vehicles of claim 2 wherein, the flow control valve works in conjunction to the hydraulic regulator which supplies a variable oil pressure to said flow control valve by using an auxiliary hydraulic pump that is configured to be driven by an output shaft connected to at least one of the driving wheels or caterpillars of the vehicle.

* * * * *